April 17, 1945.　　　　　E. MONORI　　　　　2,374,030
INDICATING SYSTEM
Filed July 29, 1943
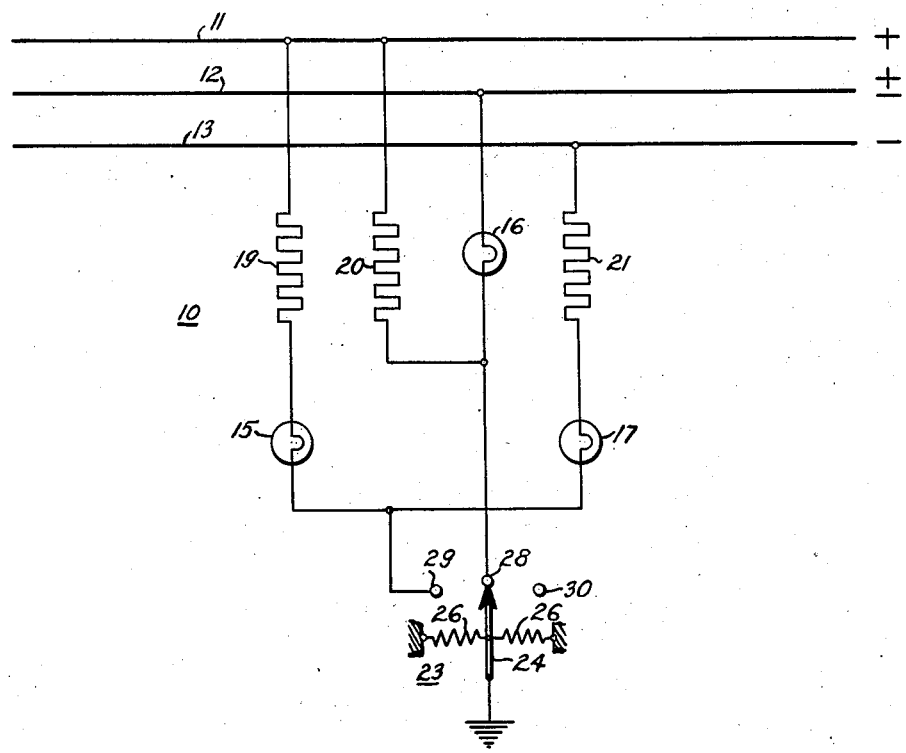
WITNESSES:
INVENTOR
Emil Monori.
BY
ATTORNEY

Patented Apr. 17, 1945

2,374,030

UNITED STATES PATENT OFFICE 2,374,030

INDICATING SYSTEM

Emil Monori, Wilkinsburg, Pa., assignor to Westinghouse Electric & Manufacturing Company, East Pittsburgh, Pa., a corporation of Delaware Application July 29, 1943, Serial No. 496,599

7 Claims. (Cl. 177—311)

My invention relates, generally, to indicating systems and has reference, in particular, to ground detector and indicating systems for 3-wire systems.

Generally stated, it is an object of my invention to provide a ground detector system that is simple and inexpensive to manufacture and operate.

More specifically, it is an object of my invention to provide for using a plurality of lamps and impedance devices with a 3-wire system for detecting and indicating the occurrence of a ground on any one of the three wires by the respective lamp being extinguished.

It is also an object of my invention to provide for using a plurality of lamps for giving a uniform indication of a ground on any one of the conductors in a 3-wire system.

Another object of my invention is to provide for switching the connections of a plurality of lamps so as to furnish a uniform indication of a ground in a 3-wire system and a uniform indication of the lamp conditions for test purposes.

Yet another object of my invention is to provide a simple and reliable ground detector and indicating system for a 3-wire system wherein the indicating lamps may be readily tested to insure against a false indication.

In practicing my invention, an indicating lamp and a current limiting resistor are provided for each of the three conductors in the 3-wire system. One lamp and its associated resistor are connected between the "third wire" and the positive wire, while the other two lamps and their associated resistors are connected in series circuit relation between the positive and negative conductors. A three-position switch is provided for normally connecting the junction of the one indicating lamp and its resistor to ground. In one of the other positions the common connection between the serially connected indicating lamps is connected to ground, and in the third position the ground connection is removed from the indicating lamps for the purpose of testing the lamps.

For a more complete understanding of the nature and scope of my invention, reference may be made to the following detailed description, which may be read in connection with the accompanying drawing, in which the single figure is a diagrammatic view of a ground detector and indicating system for a 3-wire system embodying the principal feature of my invention.

Referring to the drawing, the reference numeral 10 may denote, generally, a ground detector and indicating system for indicating a ground on any one of the three conductors in a 3-wire system, is being used, for example, in connection with the conductors 11, 12, and 13 which may be the positive (+), "third wire" (±) and negative (—) conductors, respectively, of a 3-wire direct-current system.

The indicating system 10 may comprise a plurality of indicating lamps 15, 16, and 17 provided with current limiting means, such as the resistors 19, 20, and 21, respectively. The indicating lamp 16 and its associated resistor 20 may, for example, be connected in series circuit relation between the positive conductor 11 and the third wire 12, while the indicating lamps 15 and 17 and their associated resistors 19 and 21 may be connected in series circuit relation between the positive and negative conductors 11 and 13.

A 3-position switch 23 may be utilized for providing different connections for the indicating lamps in order to secure indications of grounds on the system or of the operating conditions of the lamps. For example, the moving contact member 24 of the switch 23 may be connected to ground, and means such as the springs 26 may be provided for normally maintaining the switch in one operating position with the moving contact member 24 in engagement with a stationary contact member 28 which may be connected intermediate the indicating lamp 16 and its associated resistor 20. In the second position the moving contact member 24 may engage a second stationary contact member 29 of the switch, which may be connected intermediate the indicating lamps 15 and 17. In the third position the moving contact member may engage a third contact member 30, for providing a "test" position in which the moving contact member 24 is disengaged from both of the stationary contact members 28 and 29.

Under normal operating conditions, when none of the conductors 11, 12, and 13 is grounded and the moving contact member 24 of the switch 23 engages the stationary contact member 28, each of the three indicating lamps will burn dimly, indicating no ground on the system. Should the "third wire" or ± conductor 12 become grounded, the indicating lamp 16 will be extinguished, since both terminals of the lamp are thereby connected to ground. Should either the + conductor 11 or the — conductor 13 become grounded, the indicating lamp 16 will burn brightly, since the lamp is thereby connected directly between the "third wire" and the grounded conductor.

To determine which of the conductors 11 and 13 is grounded, the switch 23 may be operated to connect the moving contact member 24 with the stationary contact 29. With the switch 23 in this position, one or the other of the indicating lamps 15 and 17 will be extinguished. Since the lamp which is connected to the grounded conductor is shunted by the connection through the switch 23, it will be extinguished, thus indicating which of the conductors 11 and 12 is grounded.

Since failure of one or another of the indicating lamps may give a false indication of a ground on one or another of the conductors, provision has been made for easily checking the operating condition of the lamps. The switch 23 is merely operated to the "test" position removing the ground connection from the indicating lamps. Regardless of any ground condition on the system, all three indicating lamps should burn dimly if the lamps are all right. If any of the lamps should be extinguished, this indicates a burned out lamp so that defective lamps may be readily detected.

From the above description and the accompanying drawing, it will be apparent that I have provided in a simple and effective manner for indicating a ground on any one of the conductors in a 3-wire system, whether direct current or single-phase alternating current. In every instance, a uniform indication of a ground is obtained by the indicating lamp connected to the grounded conductor being extinguished instead of burning dimly as it should under normal operating conditions. False indications of a ground on the system through the failure of any of the indicating lamps may be readily detected, thus eliminating much of the trouble from this cause.

Since certain changes may be made in the above description, and different embodiments of the invention may be made without departing from the spirit or scope thereof, it is intended that all of the matter contained in the above description or shown in the accompanying drawing shall be considered as illustrative and not in a limiting sense.

I claim as my invention:

1. An indicating system for a three-conductor direct current system having a pair of principal conductors and a third conductor comprising, an indicating lamp and a resistor connected between one of the two principal conductors and the third conductor, a pair of indicating lamps connected in series circuit relation between the two principal conductors, and switch means selectively operable to connect either the common junction of the serially connected lamps or the terminal of said one lamp adjacent the said one conductor and intermediate said one lamp and its associated resistor to ground for obtaining an indication of a ground condition.

2. A ground detector system for a three-conductor system having a pair of main conductors with a third conductor of intermediate potential comprising, a plurality of lamps, circuit means including a current limiting resistor connecting one of the lamps between the third conductor and one of the principal conductors, additional circuit means including a current limiting resistor associated with each lamp connecting a pair of said lamps in series relation between the principal conductors, and switch means associated with the circuit means for selectively connecting said one lamp between the third conductor and ground or connecting a point intermediate the other two lamps and their resistors to ground.

3. A ground indicating system for a three-conductor system having a pair of main conductors with a third conductor of intermediate potential comprising, an indicating lamp, circuit means including a resistor connecting the lamp between the third conductor and one of the main conductors, a pair of indicating lamps, circuit means including a resistor associated with each lamp connecting the lamps in series circuit relation between the main conductors, and switch means including a plurality of fixed contact members and a movable contact member normally operable to connect said one lamp between the third conductor and ground for indicating a ground on the system, said movable contact member being actuable to provide a ground connection intermediate the series connected lamps for checking a ground condition.

4. A ground detector system for a three-conductor system having a pair of principal conductors of opposite polarity with a third conductor of intermediate potential comprising, an indicating lamp connected to the third conductor, resistance means connecting the lamp to one of the principal conductors, a pair of indicating lamps provided with a common connection, resistance means connecting each indicating lamp of the pair to a different one of the main conductors, and a control switch having a movable contact member connected to ground and a pair of stationary contact members engageable thereby connected intermediate the pair of indicating lamps and intermediate the said one indicating lamp and its associated resistor.

5. A ground detector and indicating system for a three-wire direct current system having positive and negative conductors with a third conductor of intermediate potential comprising, an indicating lamp having one terminal connected to the third conductor, resistance means connecting the other terminal to the positive conductor, a pair of indicating lamps having a common connection between one terminal of each, resistance means connecting the other terminals to the positive and negative conductors respectively, a control switch having a movable contact member connected to ground and disposed to engage a plurality of stationary contact members, and circuit means connecting one of the stationary contact members to the common connection and another of the stationary contact members intermediate the one indicating lamp and its associated resistance means.

6. A ground indicating system for a three-conductor system having positive and negative conductors with a third conductor of intermediate potential comprising, an indicating lamp, a resistor connecting the indicating lamp between the third conductor and the positive conductor, a pair of indicating lamps having a common connection between one terminal of each lamp, a resistor connecting the other terminals of the pair of indicating lamps to the positive and negative conductors respectively, and switch means having a stationary contact member connected to the common connection, an additional stationary contact member connected intermediate the first-mentioned indicating lamp and its resistor, and a movable contact member connected to ground, said movable contact member being disposed to normally engage the additional contact member for giving a primary indication of a ground on the system, movable to engage the other stationary contact member for giving a secondary indication of a ground, and movable to a position out of engagement with either of the stationary contact members in order to check the operating condition of the indicating lamps.

7. A ground detector system for a 3-wire system having two principal conductors and a third conductor of intermediate potential comprising, an indicating lamp, circuit means including an impedance device connecting the indicating lamp between the third conductor and one of the principal conductors, a pair of indicating lamps connected in series circuit relation, circuit means including an impedance device associated with each of the indicating lamps of the pair connecting the pair of indicating lamps between the principal conductors, and switch means including a stationary contact member connected intermediate the one indicating lamp and its impedance device, an additional stationary contact member connected intermediate the pair of indicating lamps and their associated impedance devices and a movable contact member connected to ground and normally engaging the said stationary contact member to give a primary indication of a ground on the system, said movable contact member being operable to engage the additional stationary contact member to give a secondary indication of a ground on the system and operable to a "test" position out of engagement with either of the stationary contact members for testing the operating condition of the lamps.

EMIL MONORI.